9582X
S. G. Merriman,
Sharpening Reciprocating Saws.
Patented Apr. 11, 1836.
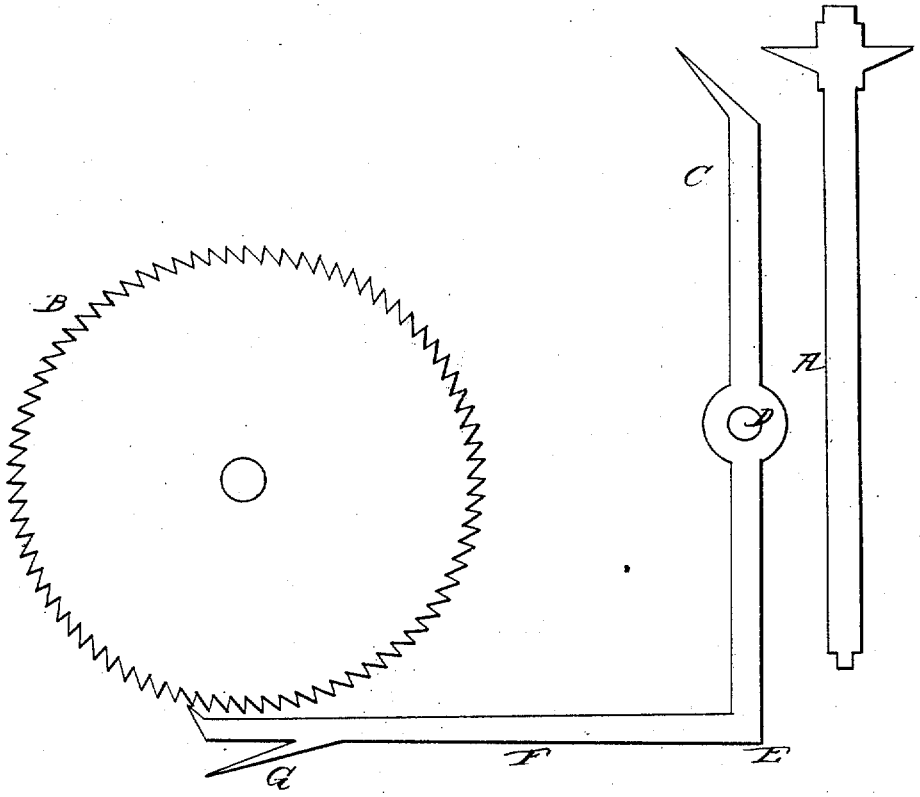
N. PETERS, PHOTO-LITHOGRAPHER, WASHINGTON, D. C.

9582X

Apl. 11, 1836

Samuel G. Merriman of Southington Connecticut "

Letters Patent.

The Schedule referred to in these Letters Patent and making part of the same; containing a description in the words of the said Samuel G. Merriman himself of his improvement in cutting the teeth of circular and other saws.

To all to whom these presents shall come: Be it known that I Samuel Green Merriman of Southington in the County of Hartford and State of Connecticut have invented a new and useful improvement in the mode and method of cutting the teeth of circular and other saws and also for cutting the saws used for cotton gins, and in the machinery necessary for effecting the same, and that the following is a full and exact description thereof. My invention and improvement consists in . . . combining the motion of a circular index or graduator with the stroke of the punch, in cutting the teeth.

This may be effected by the following machinery connected with any press properly constructed for punching or stamping iron or other metals. To such a press, considering it as standing in its usual position, I attach two projections or studs to the front part of the frame, both below the die in the press at from six to twelve inches apart, one directly above the other, and projecting from six to twelve inches more or less according to the size of the saw to be cut. Let a hole or box be made in each of these projections one inch or more in diameter. Into these boxes let the arbor (marked A in the annexed drawings) be inserted perpendicularly about twelve inches in length, having two bearings or shoulders so fitted as to revolve steadily in said boxes and having the upper end as high or higher than the die in the press. To the lower end of this arbor fix horizontally the index or graduator marked B which is a circular metallic plate having a hole in the centre of the proper size to fit on to the lower end of said arbor, where it is firmly secured by a nut. This plate or index should have the same number of no-
es, or indentations on the circumference as intended to cut teeth in the
saw. At the upper end of said arbor attach horizontally and fas-
ten with a nut the plate intended to be cut into a saw, having a
hole punched in the centre for that purpose and let the arbor be so pla-
ced that when it revolves it will bring the edge of the plate on-
to and directly over the die in the press. In the back part of
the frame of the press is inserted a pivot and on this pivot is
placed an upright lever (marked C) in or near the centre at the
point marked D. so as to move freely on the pivot. the upper
end of the lever being bent inward and over a projection on the
moveable part of the press. On the lower end of the lever at the
point (marked E) by a joint, attach a horizontal rod (marked F)
of the proper length and direction, having the end a little shar-
pened or turned so as to play into the indentations of the circula
index being supported at the end near the index by a plate or
loop fastened to the press, or its frame so as to keep it in the same
plane with the index. The die and punch in the press must
of course be suitable for cutting the teeth required. At the lower end
of the lever near the joint a spring, or weight is attached to draw
back the horizontal rod as hereafter mentioned. When the press
with this machinery attached is put in motion for use, the upright
moveable part as it rises will press by its projection against the
upper or turned end of the lever, the effect of which will be to press
the sharpened end of the horizontal rod into the notch in the
index and cause it with the arbor and the plate to revolve, and
as the upright moveable part of the press falls, the weight or spring
will draw back the horizontal rod into the next indentation of
the index. This rod is constantly pressed [illegible] upon the index by
a spring marked in the drawings G. Thus every time the press
rises the index and plate by means of the lever will revolve so far
as is necessary for the teeth required. And each fall of the press
will by means of the punch and die cut out a piece from the the plate so as to form a tooth and at the same time the spring or
weight will draw back the horizontal rod to the next indentation.
The index may be formed by placing pins at a proper distance
near the circumference of the index and at right angles with it,
and in many other . . . . . ways in which case the lever should
be made to correspond with the index and the operation will be
the same. If it is required to cut a saw with a straight edge
the same index may be used. and the plate to be cut placed
upon the dies of the press and be made to move in a right line by
means of a rack and pinion attached to the arbor. When it shall
be required to cut a saw plate with half the number of teeth on
the index this may be effected by causing the rising frame of
the press with its projection to rise so high as to force the horizon
tal rod to push the index two notches instead of one at each
rise and . . . fall. different dies and punches may be used
if necessary. For a more full illustration reference may be
had to the drawings annexed as part of this specification. and
to the model deposited in the patent office From the operation of this machinery saw teeth are cut
with great expedition and great accuracy. and as a result
from this invention it is no longer necessary that a saw plate
should be made exactly circular before the teeth are cut. For
if a square or any irregular plate is brought under the operation
of this improved machine it will of necessity produce a saw
perfectly circular of course much trouble and expense is saved
in preparing the plates. I do not claim as my invention
the press or other machinery heretofore used. for cutting the teeth
of saws by punch and die: nor do I claim as my invention
an index or graduator as such, singly, and alone, both have
been long known and used separately. But I do claim as
my invention the combination or combined use of the index
or graduator with the punch and die connected with any
machinery or press for cutting saw teeth of all or any 56 9582X 4-11-1836 4.

description in the manner and on the principles, as specified above, and for that combination and the machinery now say to effect the same as above specified & solicit Letters Patent. Dated this 19th day of March 1836.

Wit. Witnesses
Romeo Lowrey
Rogevill Whitney

Samuel G. Merriman (1319 words)

Drawing